April 5, 1938.                G. SPERTI                2,113,184
             METHOD OF RECORDING AND REPRODUCING SOUND ON FILM
                            Filed Nov. 23, 1934

INVENTOR.
George Sperti
BY Allen & Allen
ATTORNEYS.

Patented Apr. 5, 1938

2,113,184

UNITED STATES PATENT OFFICE 2,113,184

METHOD OF RECORDING AND REPRODUCING SOUND ON FILM

George Sperti, Covington, Ky.

Application November 23, 1934, Serial No. 754,505

5 Claims. (Cl. 179—100.3)

My invention has to do with the making of photographic records of vibrations of audio frequency upon a film, and with the reproduction of audible sound waves therefrom. Ordinarily my invention will be employed in connection with motion picture films, but, as will be clear, is not necessarily so restricted. In ordinary motion picture practice there is a space called a sound track adjacent the image spaces or frames on the positive motion picture film, in which sound track a photographic record of sound vibrations is made. There are two general types of photographic sound record employed. In the one type, the whole area of the sound track bears closely spaced lines or areas of greater or less translucency, as determined by waves of sound of audio frequency. This type is called the variable density type. In another method portions of the sound track upon one or both sides are rendered opaque, or nearly so, so as to leave a clear portion of the sound track which varies in width in accordance with audible vibrations. This type is called the variable area type. My method differs radically from these, as will hereinafter be set forth.

In reproducing sound from either of these types of film, a source of illumination is caused to project light through the sound track of the film, and onto a photo-sensitive cell. The light so projected is varied as to its intensity in accordance with the sound waves recorded, either by being modified as to area, as in the variable area type, or modified as to overall intensity as in the variable density type. Since the variations in area or density are quite closely spaced, it is clear that the scanning light has to be confined to a very narrow slit lying transversely of the sound track, else the reproduction of the sound will not be clear. It has not been found practicable to use a general source of illumination, confining the light which reaches the photo-cell to a narrow line by means of a mechanical slit over or against which the film moves. Such mechanical slits must be very fine, and are subject to clogging by dirt and dust in the operation of the apparatus. Consequently the practice has been to provide a source of illumination, and beyond it a lens tube. In the lens tube there is a narrow orifice, and a suitable lens or lens combination is employed to focus an image of this orifice, (which image is, of course, a narrow line of light) upon the sound track of the film. In order for the light passing through the sound track to be modified properly by the variations thereon, the sound track must be quite exactly at the focus of the lens tube, otherwise the light, during its passage through the film, will not be confined to the desired narrow line. This requirement has given rise to a serious problem, inasmuch as a vibrating or twisting movement of the film transverse to the plane of its faces will tend to carry the sound track away from the exact focus of the lens tube. In practical operation the most effective way of determining the exact position of the film, at the so-called translation point, and of preventing these twisting and vibratory movements, is to flex the film arcuately as it passes the translation point, either by drawing it about the surface of a fixed cylinder housing the photo-cell, or by passing it about the surface of a rotating cylinder, into which the photo-cell projects. Great difficulties have been had with other types of apparatus, and even where the film is drawn through an arcuate path at the translation point, some variations of position are likely to occur.

One object of my invention, therefore, is to provide a method of reproducing sound from film which will not be subject to these limitations. A more fundamental object is the provision of a method and means both of recording sound on film and of reproducing sound from film, which will give a smoother result, and a more perfect rendition of the sound. It is an object of my invention to record sound by a new form of sound record, which will have the advantages of smoother and truer operation, which may be made more simply and with less complicated apparatus, and which can be translated without the mechanical disadvantages heretofore encountered. It is further an object of my invention to provide a means for compensating both for irregularities occurring in the formation of the record, and for irregularities occurring in the translation thereof.

These and other objects of my invention which will be set forth hereinafter or will be apparent to one skilled in the art upon reading these specifications, I accomplish by that certain construction and arrangement of parts and in that process of which I shall now describe an exemplary embodiment, reference being had to the drawing which accompanies these specifications, and in which.

Briefly, in the practice of my invention, I record sound on film by means of a line of light of constant thickness, the position of which varies in the direction of the film width. Thus there is produced in the final positive film a sound track consisting of a translucent line of constant thickness on an otherwise opaque or semi-opaque field, the translucent line varying in its position in accordance with the sound waves which it records. In reproducing sound from such a sound track, I cause light to shine through it, and then through an optical wedge before reaching the photo-cell, so that as the position of the translucent line varies, the intensity of the light reaching the photo-cell will vary in accordance with the position of that portion of the translucent line on the sound track which is being scanned at the moment. It will be clear that the light which is passing through the optical wedge must be confined to a relatively narrow line transverse to the sound track; but this may be accomplished by blacking out all of the optical wedge excepting a narrow line across the face thereof, so that it is not necessary either to use the so-called optical slit nor the mechanical slits which have hitherto been suggested. Nor is it necessary to confine the light incident on the film to a thin line. Moreover, if the light striking the film is in parallel rays, there is no necessity for the film to remain exactly at the focus of any optical system. It may wave toward or away from the optical wedge through a relatively wide path of travel without affecting in any degree the quality of the sound reproduction.

As in all systems of reproducing sound from film, it is necessary that the film be held from side sway parallel with its faces to the extent that the sound track becomes displaced from the region of translation; but in my system such side-sway would tend to vary in and of itself the position of the translucent line on the sound track with reference to the optical wedge. It is relatively easy by the use of side guides, or the like, to prevent such side-sway as would carry the sound track beyond the scanning opening, but my invention contemplates the provision of means for compensating for such variations as might otherwise occur from side-sway of the film irrespective of the position of the translucent line on the sound track. Still further my invention contemplates the provision of means for compensating, in reproduction, not only for the variations which occur in reproduction, but also for those variations which occur due to substantially similar causes in the formation of the sound record.

Figure 1:
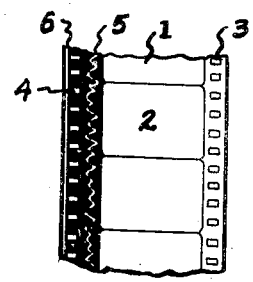
Figure 1 is a view of a portion of my film showing a sound record in accordance with my invention.
Figure 2:
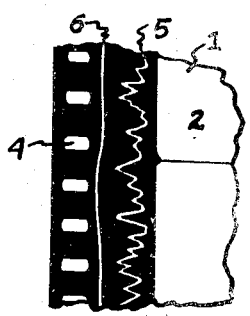
Fig. 2 is an enlarged view of a portion of the film.

I have shown in Fig. 1 a strip of film 1 having image spaces 2 thereon. Sprocket holes are indicated at 3 and 4, respectively. Between one set of the sprocket holes and the image spaces or frames 2 there is a sound track bearing a sound record indicated at 5. Outside the sprocket holes, if desired, a control or record indicated at 6 may be formed. Fig. 2 shows an enlarged section of the film. The width of the sound track is indicated by dotted lines, and in this instance the control record 6 is located inside the sprocket holes and adjacent the sound track. The sound track is opaque or darkened, excepting for the sound record 5, which is a translucent line varying its position transversely of the sound track in accordance with the sound waves. Its variations do not have to be such as to constitute it an oscillograph picture of the exact wave form; but it is easy to make the sound track in this way.

Figure 3:
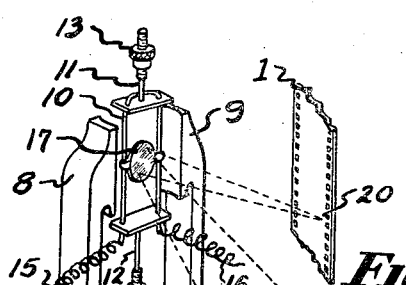
Fig. 3 is a diagrammatic view of the essential features of an apparatus which may be employed in recording sound on film in accordance with my invention.

A method of making such sound record and a suitable apparatus therefor is indicated diagrammatically in Fig. 3, wherein the film 1 may be thought of as moving in a downwardly direction propelled in a smooth manner by suitable driving means. An oscillograph type of structure comprises a magnetic core 7, having interspaced pole pieces 8 and 9. The core bears a coil 10, which may be energized by direct current so as to give a constant flux across the air gap between the poles 8 and 9. A loop of conductive wire, or the like, 10 is mounted for oscillation in the air gap between the poles 8 and 9. This loop may have a torsional suspension, being connected by wires 11 and 12 to adjustable screw members 13 and 14 fixed to suitable supports not shown. The loop 10 is closed at one end electrically, and at the other has leads indicated at 15 and 16. If electrical current varying in intensity or direction in accordance with the sounds which it is desired to record, is fed to the leads 15 and 16, a flux will be set up relative to the loop 10 which will cause the loop to turn in the air gap in accordance with the fluctuations of the impressed current. A mirror 17 may be attached to the loop so as to move therewith. I have shown a source of light 18 of substantially constant value. Rays of light from this source are focused by the lens 19 through the mirror 17, onto the film 1 at a point marked 20 located within the sound track. As the loop 10 swings in response to audiofrequency variations of electrical current impressed upon the loop leads 15 and 16, the mirror 17 will vary the position of the point of light 20 in the sound track. The downward movement of the film 1 will cause this point to trace a line on the film within the sound track so as to make a counterpart of the record 5. The film 1 in Fig. 3 may be thought of as a negative which, when developed, will show as to its sound track, a black line record on a translucent or clear sound track. When the negative is reversed or when prints are made therefrom, a record such as that shown in Fig. 2 will result, wherein the recording line is translucent upon an opaque sound track. I may also use for recording a mechanism set forth in the co-pending application of John C. Fardon, entitled Recording devices for sound on film, Serial No. 754,476, filed Nov. 23, 1934.

Figure 5:
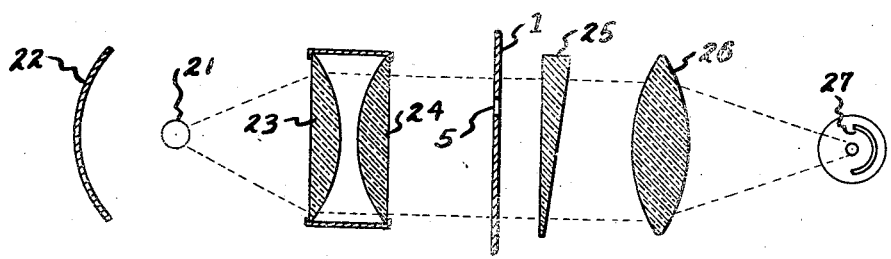
Fig. 5 is a diagrammatic showing of a reproducing apparatus.
Figure 7:
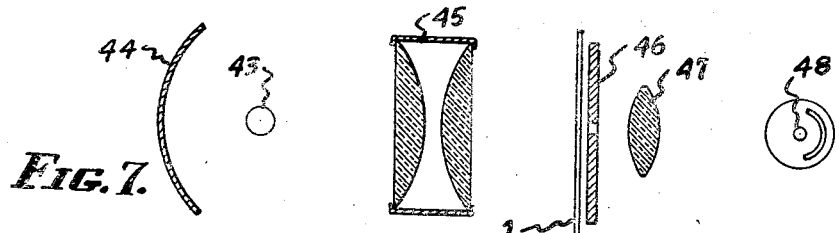
Fig. 7 is a showing of a controlling device located on the reproducer.

In reproducing sound from such a sound record, I employ a device such as that shown in Fig. 5, wherein 21 is a source of substantially constant illumination. Preferably, though not necessarily, it will have a spherical reflector 22, and condensing lenses indicated at 23 and 24. The lamp 21, the reflector and the condensers may be located in a single housing, and the system will preferably be so adjusted as to send out a beam of parallel rays of light of a width not less than the width of the sound track on the film 1. The beam of light may, of course, be very much larger in dimensions than the width of the sound track.

Light so caused to impinge upon the film 1 will pass through the translucent line 5 of the sound track and will fall upon the optical wedge upon the other side of the film. I have shown this optical wedge diagrammatically at 25 in Fig. 5. Many kinds of optical wedges may be employed, and my invention is not restricted to any one of them. It goes without saying that a material of constant light transmission value may be made into an actual wedge shape, thicker at one side than the other, or a material of constant thickness may be given a varying opacity in its several parts. The primary requirement with respect to the optical wedge is that there should be a constant or substantially constant change in its light transmitting value within the space of the width of the sound track. Beyond the optical wedge there will preferably be a lens 26, the purpose of which is to focus light passing through the wedge upon a photo-cell indicated diagrammatically at 27.

In Fig. 5, which is a sectional view, the section may be thought of as taken on a horizontal plane, the film moving downwardly vertically. Thus in the drawing the film may be thought of as moving toward or away from the observer in a path perpendicular to the plane of the drawing. It will be clear that substantially the only light which reaches the photo-cell 27 through the lens 26 is that light which passes through the translucent sound record line 5 in the film 1, and through the optical wedge 25. The translucent line 5 moves in a direction parallel with the plane of the paper in accordance with the sound variations which have been recorded thereby, as the film 1 moves in the direction indicated. As the translucent line 5 moves upwardly it comes opposite portions of the optical wedge 25 of increasing density, so that less light passes through the lens 26 to the photo-cell 27. As the translucent line 5 moves downwardly in the drawing it comes opposite portions of the optical wedge 25 of decreasing density, and consequently more light passes through the lens 26 and the photo-cell 27. The upward and downward movements of the translucent line 5 in the drawing (Fig. 5) will, of course, be left and right hand movements respectively, in a film 1 traveling upwardly or downwardly in a vertical direction when viewed from the position of the light source 21.

Figure 6:
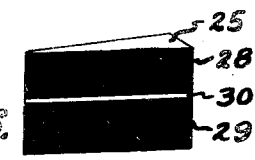
Fig. 6 is a diagrammatic showing of an optical wedge.

It will be clear that since the intensity of the light reaching the photo-cell 27 varies as herein described in accordance with the position of the translucent line 5 (the width of the line 5 remaining constant) if a sound translation varying minutely with the variations of the sound record is to be obtained, light incident upon the photo-cell must be confined to a relatively narrow line transverse of the film or vertically in the sectional drawing which is Figure 5. This may be accomplished in various ways. It is possible to employ an optical slit device, such as has hitherto been employed, in place of the condensers 23 and 24, but this involves the problem of keeping the film 1 always at the focus of the optical slit device. It is preferable, therefore, to confine the light passing through the optical wedge 9 to a narrow line in the direction of change of density in the optical wedge. This is easily done by blackening the optical wedge itself as I have shown in Fig. 6, where the wedge 25 has its faces blackened as at 28 and 29, leaving a narrow unblackened area or translucent line 30 across the face of the wedge. This does away with the necessity of accurately made optical slit devices, and has none of the disadvantages of the ordinary mechanical slit, inasmuch as the film is not drawn thereagainst. The narrow, unblackened area 30 of the optical wedge may be covered and protected by glass or other substance so as to prevent the accumulation of dust, or the wedge 25, the lens 26 and the photo-cell 27 may be included in a sealed housing. If the light beam incident upon the film consists of parallel rays as determined by the condensers 23 and 24, then not only may the slit or narrow light opening be located behind or in front of the optical wedge 25 and disconnected therewith, but also the film 1 may move toward or away from the optical wedge 25 for considerable distances without affecting in any way the quality of the reproduction of the sound. It is not necessary therefore to keep the film exactly at the focus of anything, nor is it necessary to move the film in an arcuate path for that purpose. The film may move through a straight path past the translation device, and such waving or vibration of the film toward and away from the photo-cell and associated apparatus as had prevented the securing of proper results in the past, is of no effect in modifying the effectiveness of my apparatus. It is preferable in my system to have the width of the record line on the film and the width of the slit on the optical wedge substantially equal.

It is also possible though not preferred, to eliminate the blackening of the optical wedge excepting for the light slit aforesaid. The condensers 23 and 24 may, for example, be cylindrical lenses adapted to focus the light coming through them to a narrow line, and the film may be located at this line of focus or a negative may be placed at the line of focus to straighten out the rays of light, and to give a beam of parallel light in the form of a line of very little width and of a length sufficient to cross the sound track transversely. It is also possible for me to use in reproduction a quartz rod structure of the type described by John C. Fardon in his said co-pending application. The quartz rod may be wider than it is high, and ground with a cylindrical end adapted to focus the light ray into a line. The film may be located at this line or again a negative lens may be employed to give a parallel beam of light of the desired width and the desired thinness.

Figure 8:
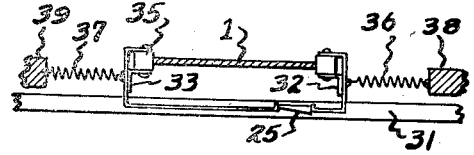
Fig. 8 shows a mechanical means for causing the optical wedge to move with the film.

As has been indicated, however, it will be clear that side-sway of the film will tend to vary the position of the translucent line 5 with respect to the optical wedge irrespective of variations of position of the line 5 on the sound track itself. This should be prevented or compensated for in some suitable manner, and a compensation method is to be preferred because it is impracticable to prevent absolutely any side-sway of the film by mechanical means. I have illustrated in Fig. 8 one way of compensating for side-sway which comprises causing the optical wedge to move with the film. Transverse to the film there is a trackway 31, upon which the optical wedge 25 is slidably mounted. The optical wedge is connected by brackets 32 and 33 to rollers 34 and 35, bearing against the actual edges of the film 1. The entire frame, including the bracket members 32 and 33, may be attached by springs 36 and 37 to supports 38 and 39 on the frame of the reproducer head. If the film 1 is subject to side-sway, i. e. movement in Fig. 8 upwardly or downwardly (Fig. 8 being a horizontal sectional view), the optical wedge will move with it so that the optical wedge remains in a constant position with respect to the edge of the sound track. Consequently only those variations in illumination caused by variations in the position of the translucent line 5 on the sound track are effective in producing variations in the reproduced sound.

I prefer, however, instead of moving the optical wedge with the film, to provide means for compensating for the said side-sway of the film as may be expected in operation, particularly because film side-sway may occur in recording as well as in the reproduction steps. Moving the optical wedge with the film in reproducing alone will not compensate for variations due to sidesway in recording, as will be clear. Therefore I prefer to employ a means and process for compensating for both sources of variation in the position of the translucent line of the sound record.

The effect of light incident upon the photo-cell 27 may be varied by varying the potential on the photo-cell 27. In the practice of my invention I vary this potential in accordance with such irregularities as occur both in the recording step and in the reproducing step. I preferebly do this by printing on the film a separate record indicated at 6 in Figs. 1 and 2. This record will again preferably be a translucent line upon a dark ground. It is possible to vary the density of this translucent light in accordance with side-sway variations occurring in recording, but this is not ordinarily to be preferred. It is preferred to set up in the recorder, in a fixed position, a device which will trace with light a line on the film. This line may be adjacent the sound track or in some other part of the film. So long as there is no side-sway of the film during recording this line will be a straight longitudinal line. To the extent that the film sways from side to side in recording, this line will vary its position with respect to the side edges of the film. In reproducing light may be caused to shine through this translucent line and onto a photo-cell, the voltage output of which will be coupled to the reproducing photo-cell 27 so as to vary the bias thereon, these circuit connections being obvious to one skilled in the art. There will be no problem of a slit in connection with such a control. A simple gate of small size may be employed, being circular or polygonal, preferably not of greater depth than width, and of a width not substantially exceeding the width of the controlling translucent line on the film, which line may be relatively wide if desired, but will preferably be about as wide as the expected degree of sidesway. As the line moves away from the gate, less light will reach the controlling photo-cell, and the bias on the reproducing photo-cell will be varied accordingly. The controlling translucent line may move with respect to the gate either because its position varies on the film due to sidesway of the film in recording, or because of side-sway in the film during reproduction. In the first instance the control effected will compensate for changes in the bodily position of the sound track as such due to side-sway during recording, and in the second instance it will compensate for variations of the position of the sound track with respect to the optical wedge due to side-sway during reproduction. Hence both of these sources of variation are compensated simultaneously, and in this way I secure a much more faithful reproduction of sound than has been possible hitherto, and especially a much more faithful reproduction of the sound level of the original sound recorded.

Figure 4:
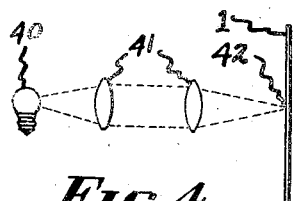
Fig. 4 is a diagrammatic showing of a means for producing a controlling record on the film.

In Fig. 4 I have shown for the recording device a source of illumination 40, and a lens system 41 serving to focus the rays of light upon a point or spot 42 on the film 1. The source of illumination and the optical system will be fixed in the recording head, and consequently the line traced by the spot 42 on the film 1 will vary its position with respect to the edges thereof if side-sway occurs in the film 1. In the reproducing head I provide a source of illumination 43, and preferably a spherical reflector 44, and a condenser device 45. These devices may be the same, if desired, as the devices 21 to 24 in Fig. 5, or they may be separately provided. The film is again indicated at 1, and a member providing a light gate is shown at 46. Behind the light gate there will be a lens 47, and the supplementary or control photo-cell 48. It will be understood that the control record printing device in the recording head and the control mechanism actuated by the control record in the reproducing head may be located in either instance above or below the devices which produce or translate the record.

Controlling for side-sway both in recording and in reproducing in accordance with the position of a line of light with respect to the edges of the film makes it possible to employ the control record 6 for still another function, namely a function of automatic monitoring during reproduction. The control record 6 may be lightly printed during recording so that in the ultimate positive the control line will not be perfectly clear. Thus, variations in the exposure in printing different positives from the same negative, or variations in the overall density of separate positives printed from different negatives will largely be compensated for in reproduction because variations in the density of the control lines will, through the photo-cell 48, modify the bias on the photo-cell 27. Moreover, during recording it may be desired to monitor the general level of the sounds being recorded, and this may readily be done by varying, automatically or by hand, the brightness of the source of illumination 40 in Fig. 4. Upon reproduction, irrespective of the general sound level represented by variations of the translucent line 5, in the film, the density of the translucent line thus in the film will control the sound level of reproduction to the particular degree determined by the monitor during recording, while the position of the line 6 will simultaneously compensate for variations due to side-sway of the film both in recording and in reproduction.

It will be understood that modifications may be made in my invention without departing from the spirit thereof. In my drawing I have illustrated various mechanical elements diagrammatically, and it will be understood that these elements or their equivalents may be assembled and mounted in widely varying ways, according to the desire of the builder or the general design of the recording or reproducing head. Other or equivalent apparatus may be substituted for those I have diagrammatically illustrated in the practice of my process. For example, but without limitation, a recording device such as that disclosed and claimed in the co-pending application of John Farden, filed of even date herewith, may be substituted for the recording device shown in my Fig. 3. The essential novelty of my invention is expressed in the appended claims.

I claim:

1. A process of reproducing sound from records having an oscillograph type sound record and a control record, which comprises causing light to shine through said oscillograph record, thence through an optical wedge and onto a photo-sensitive device, simultaneously causing light to shine through said control record and onto a photo-sensitive device and causing the output of said second photo-sensitive device to control the output of said first photo-sensitive device.

2. A method of reproducing sound which comprises converting a record on a sound track into electrical variations susceptible of audible reproduction, and simultaneously causing variations in the lateral position of said sound record as a whole relative to reproduction apparatus to correct the amplitude of said electrical variations as modified by said lateral variations.

3. In combination with a film having a sound record of the oscillograph type and a control record, a source of illumination, an optical wedge and a photo-sensitive device in the order named, the sound record portion of said film being located between said source of illumination and said photo-sensitive device, a second source of illumination, a gate and a second photo-sensitive device in the order named, the control record portion of said film being located between said source of light and said photo-sensitive device, and electrical means for causing the output of the second of said photo-sensitive devices to control the output of the first of said devices.

4. In combination with a film bearing a sound track of the oscillograph type, a source of illumination, an optical wedge and a photo-sensitive device in the order named, the sound record portion of said film being located between said source of illumination and said photo-sensitive device, and means for continuously compensating the output of said photo-sensitive device for variations due to lateral movement of said film.

5. In combination with a film having a record of the oscillograph type thereon, a source of illumination, an optical wedge and a photo-sensitive device in the order named, the record portion of said film being located between said source of illumination and said photo-sensitive device, and means for causing bodily movement of said optical wedge in accordance with lateral movements of said film.

GEORGE SPERTI.